(12) United States Patent  
Moore

(10) Patent No.: US 11,140,932 B2
(45) Date of Patent: Oct. 12, 2021

(54) WAISTBAND BASE LAYER CONSTRUCTION

(71) Applicant: Nike, Inc., Beaverton, OR (US)

(72) Inventor: Bruce Y. Moore, Laguna Beach, CA (US)

(73) Assignee: NIKE, Inc., Beaverton, OR (US)

( * ) Notice: Subject to any disclaimer, the term of this patent is extended or adjusted under 35 U.S.C. 154(b) by 161 days.

(21) Appl. No.: 16/084,343

(22) PCT Filed: Mar. 10, 2017

(86) PCT No.: PCT/US2017/021748
§ 371 (c)(1),
(2) Date: Sep. 12, 2018

(87) PCT Pub. No.: WO2017/156373
PCT Pub. Date: Sep. 14, 2017

(65) Prior Publication Data
US 2019/0053557 A1    Feb. 21, 2019

Related U.S. Application Data

(60) Provisional application No. 62/306,271, filed on Mar. 10, 2016.

(51) Int. Cl.
A41F 9/00 (2006.01)
A41D 27/24 (2006.01)
(Continued)

(52) U.S. Cl.
CPC ............... A41F 9/00 (2013.01); A41D 7/005 (2013.01); A41D 27/00 (2013.01); A41D 27/245 (2013.01);
(Continued)

(58) Field of Classification Search
CPC .................. A41F 9/00; A41D 7/005
See application file for complete search history.

(56) References Cited

U.S. PATENT DOCUMENTS 1,408,871 A    3/1922 Enos
1,789,823 A    1/1931 Lehman
(Continued)

FOREIGN PATENT DOCUMENTS

CN    102228318 A    11/2011
CN    104955348 A    9/2015
(Continued)

OTHER PUBLICATIONS

European Patent Office as the International Searching Authority, International Search Report and Written Opinion for International Application No. PCT/US2017/021748, dated Jun. 6, 2017.
(Continued)

Primary Examiner — Alissa J Tompkins
Assistant Examiner — Brieanna Szafran
(74) Attorney, Agent, or Firm — Honigman LLP; Matthew H. Szalach; Jonathan O'Brien

(57) ABSTRACT

A structure for an article of clothing is provided and may include a first material layer defining an opening of the article of clothing and having a first portion defining an inner surface of the opening and an outer surface formed on an opposite side of the first portion than the inner surface and defining an outer surface of the opening. The structure may additionally include a plastic film attached to the inner surface and movable between a relaxed state and an expanded state, whereby the plastic film substantially surrounds the opening of the article of clothing.

20 Claims, 1 Drawing Sheet

(51) Int. Cl.
 *A41D 7/00* (2006.01)
 *A41D 27/00* (2006.01)
 *B32B 7/12* (2006.01)
 *B32B 27/40* (2006.01)

(52) U.S. Cl.
 CPC ............... *B32B 7/12* (2013.01); *B32B 27/40* (2013.01); *A41D 2300/22* (2013.01); *A41D 2300/52* (2013.01); *B32B 2307/51* (2013.01); *B32B 2437/00* (2013.01)

(56) References Cited

U.S. PATENT DOCUMENTS

| | | | |
|---|---|---|---|
| 1,995,734 A * | 3/1935 | Callahan | B32B 25/10 |
| | | | 428/90 |
| 3,215,584 A | 11/1965 | McConnell | |
| 3,711,868 A * | 1/1973 | Kristof | A41F 9/00 |
| | | | 2/237 |
| 4,404,243 A | 9/1983 | Terpay | |
| 4,741,791 A | 5/1988 | Howard et al. | |
| 5,008,130 A | 4/1991 | Lenards | |
| 5,059,452 A | 10/1991 | Squires | |
| 5,766,397 A | 6/1998 | Jones | |
| 7,410,682 B2 | 8/2008 | Abrams | |
| 7,749,589 B2 | 7/2010 | Abrams | |
| 8,424,474 B2 | 4/2013 | Berns | |
| 2001/0008672 A1 * | 7/2001 | Norvell | A41D 31/125 |
| | | | 428/90 |
| 2006/0080755 A1 | 4/2006 | Baron et al. | |
| 2010/0275344 A1 | 11/2010 | Demarest et al. | |
| 2011/0041232 A1 * | 2/2011 | Covelli | A41D 27/02 |
| | | | 2/69 |
| 2014/0208484 A1 | 7/2014 | Huff et al. | |

FOREIGN PATENT DOCUMENTS

| | | |
|---|---|---|
| CN | 105188437 A | 12/2015 |
| GB | 866963 A | 5/1961 |
| GB | 1392199 A | 4/1975 |
| WO | WO-2012004603 A1 | 1/2012 |

OTHER PUBLICATIONS

China National Intellectual Property Administration, Second Office Action for CN Application No. 201780015678.9, dated Apr. 26, 2020.

China National Intellectual Property Administration, First Office Action for CN Application No. 201780015678.9, dated Aug. 2, 2019.

* cited by examiner

WAISTBAND BASE LAYER CONSTRUCTION

CROSS REFERENCE TO RELATED APPLICATION

This application is a national phase of International Application No. PCT/US2017/021748, filed Mar. 10, 2017, which claims priority to U.S. Provisional Application Ser. No. 62/306,271, filed Mar. 10, 2016 the disclosure of which are hereby incorporated by reference in their entirety.

FIELD

The present disclosure relates generally to a waistband construction and more particularly to a waistband construction for an article of clothing.

BACKGROUND

This section provides background information related to the present disclosure which is not necessarily prior art.

It is common for an article of clothing, such as pants, shorts, or swimming apparel, to include a waistband. Conventional waistbands are used to secure an article of clothing around a person's waist and typically include at least one of a drawstring and a woven, elastic structure.

A drawstring may be used to selectively constrict the waistband around a person's waist and is movable between a relaxed state and a constricted state. A woven, elastic structure may be used with or without a drawstring and is movable between a relaxed state and an expanded state.

In operation, the woven, elastic structure is moved from the relaxed state to the expanded state to facilitate proper positioning of the article of clothing (i.e., when a person is getting dressed) and automatically returns to the constricted state when the waistband is positioned around the person's waist. Allowing the woven, elastic material to automatically return to the constricted state upon being positioned at the person's waist allows the waistband to maintain a desired position at the person's waist during use. If the article of clothing additionally includes a drawstring, the drawstring may be moved to the constricted state to further secure a position of the waistband and, thus, the article of clothing around the person's waist.

While conventional waistbands are adequately held in a desired position at a person's waist during use, such waistbands are typically constructed of a material that absorbs water during use and, as such, are not ideally suited for use in a wet environment. For example, conventional drawstrings and woven, elastic structures are typically constructed at least partially from a fabric material. Such fabric material absorbs and retains moisture during use and, as such, is not ideal for use in wet environments.

DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 2:
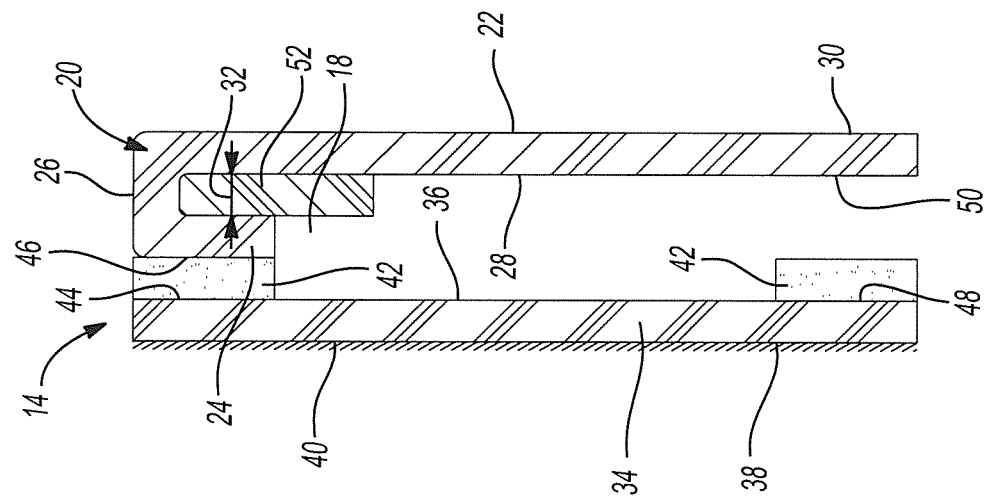
FIG. 2 is cross sectional view of a waistband of the article of clothing of FIG. 1 taken along Line 2-2 of FIG. 1.

Example embodiments will now be described more fully with reference to the accompanying drawings. Example embodiments are provided so that this disclosure will be thorough, and will fully convey the scope of those who are skilled in the art. Numerous specific details are set forth, such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of molded features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

A structure for an article of clothing is provided and may include a first material layer defining an opening of the article of clothing and having a first portion defining an inner surface of the opening and an outer surface formed on an opposite side of the first portion than the inner surface and defining an outer surface of the opening. The structure may additionally include a plastic film attached to the inner surface and movable between a relaxed state and an expanded state, whereby the plastic film substantially surrounds the opening of the article of clothing.

In one configuration, the plastic film is biased into the relaxed state by the elastic nature of the plastic film and/or is a polyurethane film.

The first material layer may include a second portion opposing the inner surface. The plastic film may be attached to the second portion and/or may be disposed between the first portion and the second portion. The first material layer may include a third portion disposed between and connecting the first portion and the second portion. The first portion, the second portion, and the third portion may be formed from the same, unitary piece of material. The third portion may oppose the plastic film.

A second material layer may oppose the first material layer. The plastic film may be disposed between the first material layer and the second material layer. The plastic film may be bounded by the first material layer, the second material layer, and the third material layer. Additionally, the second material layer may include flocking. A first adhesive layer may be disposed between and connect the first material layer and the second material layer. Further, a second adhesive layer may be disposed between and connect the first material layer and the second material layer. The second adhesive layer may be spaced apart from the first adhesive layer.

In one configuration, the opening is one of a waistband opening, a neck opening, an arm opening, and a leg opening.

A method of manufacturing an article of clothing is provided and includes providing a first material layer that defines an opening of the article of clothing with a first portion defining an inner surface of the opening and an outer surface formed on an opposite side of the first portion than the inner surface and defining an outer surface of the opening. The method additionally includes attaching a plastic film to the inner surface, whereby the plastic film is movable between a relaxed state and an expanded state and substantially surrounds the opening of the article of clothing.

In one configuration, the method may include biasing the plastic film into the relaxed state by the elastic nature of the plastic film.

Attaching a plastic film may include attaching a polyurethane film.

Providing a first material layer may include providing the first material layer with a second portion opposing the inner surface. The method may include attaching the plastic film to the second portion and/or positioning the plastic film between the first portion and the second portion. Providing a first material layer may include providing the first material layer with a third portion disposed between and connecting the first portion and the second portion.

In one configuration, the method may include forming the first portion, the second portion, and the third portion from the same, unitary piece of material. The method may additionally include opposing the third portion with the plastic film.

A second material layer may be provided that opposes the first material layer. The method may include positioning the plastic film between the first material layer and the second material layer. Further, the method may additionally include bounding the plastic film to at least one of the first material layer, the second material layer, and the third material layer.

In one configuration, the method may include providing the second material layer with flocking.

The method may include applying a first adhesive layer between and to the first material layer and the second material layer. A second adhesive layer may additionally be applied between and to the first material layer and the second material layer and may be spaced apart from the first adhesive layer.

Defining an opening in the article of clothing may include defining one of a waistband opening, a neck opening, an arm opening, and a leg opening.

Figure 1:
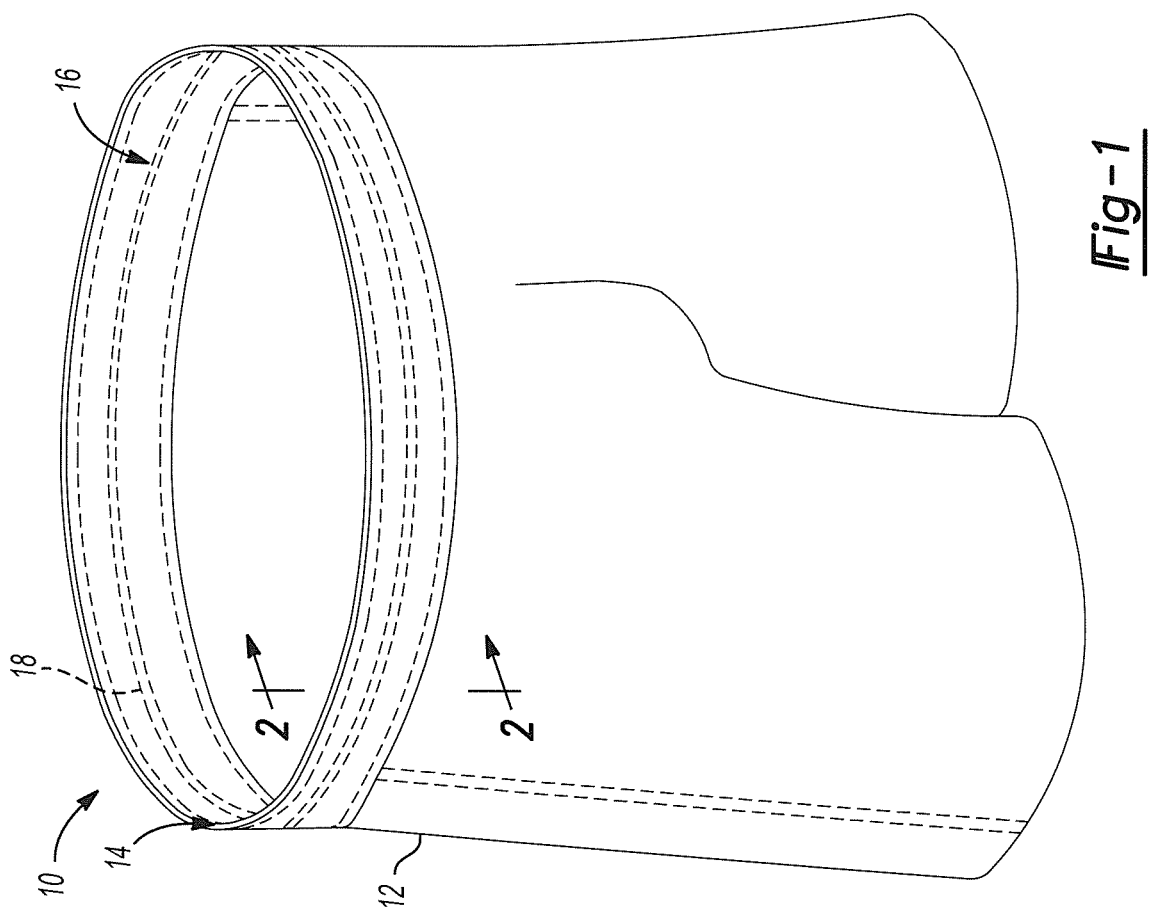
FIG. 1 is a perspective view of an article of clothing.

With reference to FIG. 1, an article of clothing 10 is provided. While the article of clothing 10 is illustrated and described herein as being a pair of shorts, the article of clothing 10 may include other forms such as, for example, pants or shirts, within the scope of the present disclosure. In this regard, the article of clothing 10 may include any form of clothing that is adapted to be worn around a user's waist and/or includes an opening that may receive a body part of a person. For example, the structure below—while described in conjunction with a waistband—may be used in a shirt or sweatshirt to secure an arm or neck opening of the shirt or sweatshirt to a respective body part of a person.

The article of clothing 10 includes a body 12 and a waistband 14 attached to the body 12. The waistband 14 may form an opening 16 and may be formed at least in part of a fabric material. The waistband 14 may move between a relaxed state and an expanded state by the elasticity of the waistband 14 itself, as will be described below. In some configurations, the waistband 14 may additionally include a securing mechanism 18 that cooperates with the material of the waistband to secure the article of clothing 10 in a desired position relative to a person's waist.

With reference to FIG. 2, the waistband 14 is shown as including a first material layer 20 having a first portion 22, a second portion 24, and a third portion 26. The first material layer 20 includes an inner surface 28 and an outer surface 30 formed on an opposite side of the first material layer 20 than the inner surface 28. In one configuration, the outer surface 30 of the first portion 22 may form an outer surface of the body 12 of the article of clothing 10. In such a configuration, the first material layer 20 may be formed from the same, unitary piece of material that forms the body 12.

The first material layer 20 may be folded on itself to define the second portion 24 and the third portion 26. In so doing, the second portion 24 may oppose the first portion 20 such that the second portion 24 is substantially parallel to the first portion 20. The third portion 26 may be disposed between and may connect the first portion 20 and the second portion 24 and may include a length that spaces the second portion 24 apart from the first portion 20 to define a gap 32 therebetween.

The first material layer 20 may be formed from any material conventionally used in manufacturing articles of clothing. For example, the first material layer 20 may be formed from a woven or knit fabric material that provides a degree of stretch to the waistband 14 such as, for example, Lycra®, Polyester, Nylon, PBT (polybutylene terephthalate) Polyester, and/or XLA fabric.

The first material layer 22 may be attached to a second material layer 34. The second material layer 34 may include an inner surface 36 opposing the inner surface 28 of the first material layer and an outer surface 38 opposing a user during use. As with the first material layer 22, the second material layer 34 may be formed from any material conventionally used in manufacturing articles of clothing. For example, the second material layer 34 may be formed from a woven or knit fabric material that provides a degree of stretch to the waistband 14 such as, for example, Lycra®, Polyester, Nylon, PBT (polybutylene terephthalate) Polyester, and/or XLA fabric.

The second material layer 34 may also include flocking 40 disposed on the outer surface 38. The flocking 40 provides a degree of comfort to the wearer and, further, serves to maintain a relative position of the waistband 14 and, thus, the article of clothing 10 relative to a person's waist during use. The flocking 40 may be ideally suited for use in wet conditions if the article of clothing 10 is a pair of swim shorts or is used as a base layer during surfing, as the flocking 40 permits water to flow between the inner surface 38 and the person's waist while maintaining a desired relative position between the waistband and the person.

The second material layer 34 may be attached to the first material layer 20 by an adhesive 42 at a first attachment location 44 located on the inner surface 38 of the second material layer 34 and a second attachment location 46 located on the second portion 24 of the first material layer 20. The adhesive 42 may additionally be applied at a third attachment location 48 located on the inner surface 38 of the second material layer 34 and at a fourth attachment location 50 located on the inner surface 28 of the first portion 22 of the first material layer 20. In one configuration, the first attachment location 44 is spaced apart from the third attachment location 48 along a length of the second material layer 34.

The adhesive 42 may be any suitable adhesive that joins the first material layer 20 and the second material layer 34. For example, the adhesive 42 may be a Bemis® adhesive tape that is selected based on the specific materials of the first material layer 20 and the second material layer 34. The adhesive tape may be selected based on the material of the first material layer 20 and the second material layer 34 to ensure proper adhesion of the adhesive 42 to both layers 20, 34. In one specific example, the adhesive 42 is a ¼" Bemis® adhesive tape that is applied around the waistband 14 such that the adhesive 42 surrounds a person's waist during use.

With continued reference to FIG. 2, the waistband 14 additionally includes a plastic film 52 that is movable between a relaxed state and an expanded state. The plastic film 52 may be received within the gap 32 formed between the first portion 22 and the second portion 24 of the first material layer 20. The plastic film 52 may therefore be bounded by the first portion 22, the second portion 24, and the third portion 26. The third portion 26 may extend over the plastic film 52 to act as a barrier between the plastic film 52 and a person during use in an effort to increase the comfort of the person.

The plastic film 52 may be attached to one or more of the first portion 22, the second portion 24, and the third portion 26 by the material of the plastic film 52 itself and/or via a suitable adhesive. The plastic film 52 is formed from a material have an elastic quality that automatically returns the plastic film 52 to the relaxed state from the expanded state. As such, the plastic film 52 is used in the waistband 14 to constrict the waistband 14 around a person's waist once the waistband 14 is positioned at a desired location relative to the person's waist. The elasticity of the plastic film 52 also allows for ease of use of the article of clothing 10 by allowing the waistband 14 to be expanded to allow the article of clothing 10 to be moved over a person's body when getting dressed and automatically constricts the waistband 14 to the person's body when properly positioned relative to the person's waist, for example. The securing mechanism 18 may cooperate with the plastic film 52 to further secure the waistband 14 to the person's waist by further constricting the waistband 14.

The plastic film 52 may be formed from any polymer that allows the plastic film 52 to automatically return to the relaxed (i.e., constricted) state once a force applied to the waistband 14 is removed. For example, the plastic film 52 may be formed from a polyurethane film that surrounds the waistband 14. The polyurethane film may be ½" Ding-Zing® polyurethane film that surrounds a person's waist during use. While a plastic material such as polyurethane is disclosed, the film 52 could be formed from any suitable material that automatically returns to a relaxed state from an expanded state such as, for example, rubber.

In use, the article of clothing 10 may be worn by a person by applying a force to the waistband 14 to move the plastic tape 52 from the relaxed state to the expanded state. In so doing, an effective size of the opening 16 is increased to allow the article of clothing 10 to pass over the person's body before being properly positioned at the person's waist. Once the article of clothing 10 is properly positioned at the person's waist, the force applied to the waistband 14 may be released and the plastic film 52 is permitted to return to the relaxed state. In the relaxed state, the plastic film 52 constricts the waistband 14 around the person's waist and, as a result, helps to maintain a position of the waistband 14 and, thus, the article of clothing 10, relative to the person's waist.

The following Clauses provide an exemplary configuration for an article of clothing described above.

Clause 1: A structure for an article of clothing, the structure comprising a first material layer defining an opening of the article of clothing and including a first portion defining an inner surface of the opening and an outer surface formed on an opposite side of the first portion than the inner surface and defining an outer surface of the opening and a plastic film attached to the inner surface and movable between a relaxed state and an expanded state, the plastic film substantially surrounding the opening of the article of clothing.

Clause 2: The structure of Clause 1, wherein the plastic film is biased into the relaxed state by the elastic nature of the plastic film.

Clause 3: The structure of Clause 1, wherein the plastic film is a polyurethane film.

Clause 4: The structure of Clause 1, wherein the first material layer includes a second portion opposing the inner surface.

Clause 5: The structure of Clause 4, wherein the plastic film is attached to the second portion.

Clause 6: The structure of Clause 4, wherein the plastic film is disposed between the first portion and the second portion.

Clause 7: The structure of Clause 4, wherein the first material layer includes a third portion disposed between and connecting the first portion and the second portion.

Clause 8: The structure of Clause 7, wherein the first portion, the second portion, and the third portion are formed from the same, unitary piece of material.

Clause 9: The structure of Clause 7, wherein the third portion opposes the plastic film.

Clause 10: The structure of Clause 1, further comprising a second material layer opposing the first material layer.

Clause 11: The structure of Clause 10, wherein the plastic film is disposed between the first material layer and the second material layer.

Clause 12: The structure of Clause 10, wherein the plastic film is bounded by the first material layer, the second material layer, and the third material layer.

Clause 13: The structure of Clause 10, wherein the second material layer includes flocking.

Clause 14: The structure of Clause 10, further comprising a first adhesive layer disposed between and connecting the first material layer and the second material layer.

Clause 15: The structure of Clause 14, further comprising a second adhesive layer disposed between and connecting the first material layer and the second material layer.

Clause 16: The structure of Clause 15, wherein the second adhesive layer is spaced apart from the first adhesive layer.

Clause 17: The structure of Clause 1, wherein the opening is one of a waistband opening, a neck opening, an arm opening, and a leg opening.

Clause 18: A method of manufacturing an article of clothing, the method comprising providing a first material layer that defines an opening of the article of clothing with a first portion defining an inner surface of the opening and an outer surface formed on an opposite side of the first portion than the inner surface and defining an outer surface of the opening and attaching a plastic film to the inner surface, the plastic film being movable between a relaxed state and an expanded state and substantially surrounds the opening of the article of clothing.

Clause 19: The method of Clause 18, further comprising biasing the plastic film into the relaxed state by the elastic nature of the plastic film.

Clause 20: The method of Clause 18, wherein attaching a plastic film includes attaching a polyurethane film.

Clause 21: The method of Clause 18, wherein providing a first material layer includes providing the first material layer with a second portion opposing the inner surface.

Clause 22: The method of Clause 21, further comprising attaching the plastic film to the second portion.

Clause 23: The method of Clause 21, further comprising positioning the plastic film between the first portion and the second portion.

Clause 24: The method of Clause 21, wherein providing a first material layer includes providing the first material layer with a third portion disposed between and connecting the first portion and the second portion.

Clause 25: The method of Clause 24, further comprising forming the first portion, the second portion, and the third portion from the same, unitary piece of material.

Clause 26: The method of Clause 24, further comprising opposing the third portion with the plastic film.

Clause 27: The method of Clause 18, further comprising providing a second material layer that opposes the first material layer.

Clause 28: The method of Clause 27, further comprising positioning the plastic film between the first material layer and the second material layer.

Clause 29: The method of Clause 27, further comprising bounding the plastic film by the first material layer, the second material layer, and the third material layer.

Clause 30: The method of Clause 27, further comprising providing the second material layer with flocking.

Clause 31: The method of Clause 27, further comprising applying a first adhesive layer between and to the first material layer and the second material layer.

Clause 32: The method of Clause 31, further comprising applying a second adhesive layer between and to the first material layer and the second material layer.

Clause 33: The method of Clause 32, further comprising spacing the second adhesive layer apart from the first adhesive layer.

Clause 34: The method of Clause 18, wherein defining an opening in the article of clothing includes defining one of a waistband opening, a neck opening, an arm opening, and a leg opening.

The foregoing description of the embodiments has been provided for purposes of illustration and description. It is not intended to be exhaustive or to limit the disclosure. Individual elements or feature of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A structure for an article of clothing, the structure comprising:
   a first material layer including an inner surface and an outer surface formed on an opposite side than the inner surface, the first material layer including a first portion and a second portion spaced apart from the first portion by a gap;
   a plastic film attached to the inner surface within the gap and movable between a relaxed state and an expanded state;
   a second material layer having a first attachment location attached to the outer surface of the first material layer along the second portion and a second attachment location attached to the inner surface of the first material layer along the first portion, the second portion being disposed between the first attachment location and the plastic film; and
   a first adhesive layer disposed between and connecting the second material layer and the first portion.

2. The structure of claim 1, wherein the plastic film is biased into the relaxed state by the elastic nature of the plastic film.

3. The structure of claim 1, wherein the plastic film is a polyurethane film.

4. The structure of claim 1, wherein the plastic film is attached to the second portion.

5. The structure of claim 1, wherein the plastic film is disposed between the first portion and the second portion.

6. The structure of claim 1, wherein the first material layer includes a third portion disposed between and connecting the first portion and the second portion.

7. The structure of claim 6, wherein the first portion, the second portion, and the third portion are formed from the same, unitary piece of material.

8. The structure of claim 1, wherein the plastic film is disposed between the first material layer and the second material layer.

9. The structure of claim 1, wherein the second material layer includes flocking.

10. The structure of claim 1, further comprising a second adhesive layer disposed between and connecting the second material layer and the second portion.

11. The structure of claim 10, wherein the first adhesive layer is spaced apart from the second adhesive layer.

12. A structure for an article of clothing, the structure comprising:
a first material layer including an inner surface and an outer surface formed on an opposite side than the inner surface, the first material layer including a first portion and a second portion spaced apart from the first portion by a gap;
a plastic film attached to the inner surface within the gap and movable between a relaxed state and an expanded state; and
a second material layer having (i) flocking, (ii) a first attachment location attached to the outer surface of the first material layer along the second portion, and (iii) a second attachment location attached to the inner surface of the first material layer along the first portion, the second portion being disposed between the first attachment location and the plastic film.

13. The structure of claim 12, wherein the plastic film is biased into the relaxed state by the elastic nature of the plastic film.

14. The structure of claim 12, wherein the plastic film is a polyurethane film.

15. The structure of claim 12, wherein the plastic film is attached to the second portion.

16. The structure of claim 12, wherein the plastic film is disposed between the first portion and the second portion.

17. The structure of claim 12, wherein the first material layer includes a third portion disposed between and connecting the first portion and the second portion.

18. The structure of claim 17, wherein the first portion, the second portion, and the third portion are formed from the same, unitary piece of material.

19. The structure of claim 12, wherein the plastic film is disposed between the first material layer and the second material layer.

20. The structure of claim 12, further comprising a first adhesive layer spaced apart from a second adhesive layer, the first adhesive layer disposed between and connecting the second material layer and the first portion and the second adhesive layer disposed between and connecting the second material layer and the second portion.

\* \* \* \* \*